United States Patent [19]
Yahagi

[11] Patent Number: 4,806,708
[45] Date of Patent: Feb. 21, 1989

[54] COORDINATE DETERMINING DEVICE AND METHOD OF DETERMINING X-Y COORDINATE POSITION

[75] Inventor: Hisashi Yahagi, Zama, Japan

[73] Assignee: Graphtec Kabushiki Kaisha, Tokyo, Japan

[21] Appl. No.: 148,353

[22] Filed: Jan. 25, 1988

[30] Foreign Application Priority Data

Feb. 4, 1987 [JP] Japan ................................ 62-23850

[51] Int. Cl.$^4$ ............................................. G08C 21/00
[52] U.S. Cl. ......................................... 178/18; 178/19
[58] Field of Search ................................. 178/18, 19

[56] References Cited

U.S. PATENT DOCUMENTS 4,717,793 1/1988 Kobayashi .......................... 178/18

Primary Examiner—Stafford D. Schreyer
Attorney, Agent, or Firm—Joseph S. Iandiorio

[57] ABSTRACT

A coordinate determining tablet and method for determining an X-Y coordinate position using electromagnetic induction, including a plurality of conductive wires mounted on an insulating plate such that the wires are formed in a parallel return winding pattern displaced from each other by an interval; one end of the conductive wires forming the return are connected to a common conductive wire, while the other end of the conductive wires are each connected to one terminal of a switch provided for each parallel winding; the other terminals of the switches are connected alternately to three common conductive wires; the switches are arranged in a number of groups so as to simultaneously turn on and off groups of parallel winding patterns at a predetermined interval. The coordinate determining method includes inducing a current in a cursor, sequentially turning on and off the switches in the groups, adding together the signals induced in the conductive wires, discriminating and comparing the signals, and determining an absolute position of the cursor on the coordinate plane.

45 Claims, 11 Drawing Sheets

COORDINATE DETERMINING DEVICE AND METHOD OF DETERMINING X-Y COORDINATE POSITION

BACKGROUND OF THE INVENTION

The present invention relates to a device for determining a coordinate of a point on a flat surface, and more particularly to a device for determining where an arbitrary point of a graphic material is located on an X-Y coordinate system by using electromagnetic induction.

A coordinate position determining device is one of generally so-called digitizers, wherein a coordinate position of an arbitrary point on a flat surface is determined in terms of phase shift amount by using electromagnetic induction, and the coordinate position is outputted in the form of digital signal. Most of the devices of this type have adopted a two-phase grid system.

As a typical example of such prior art, there is known a Japanese Patent Laid-open Publication JP-A-49-67521 (Japanese Patent Publication JP-B-53-34855) which employs a coordinate determining tablet of three layers with an X-axis base, Y-axis base and selector base laminated from the top in this order. The X-axis base comprises first and second conducting wires formed on one surface of an electrically insulating sheet. The first conducting wire is configured to have a zig-zag pattern composed of a plurality of rectangles with one empty side alternately disposed at every half pitch along the X-axis, while the second conductive wire, although it is formed to have a same continuous zig-zag pattern as the first conductive wire, is electrically insulated and displaced from the first conductive wire by a quarter pitch in the X-direction. Similarly, the Y-axis base comprises two conductive wires formed on one surface of an electrically insulating sheet, the two conductive wires forming two continuous zig-zag patterns with a quarter pitch displaced from each other in the Y-direction. The selector base comprises two sets of conductive wire elements, one set of conducting wire elements disposed in parallel along the X-direction and being insulated from and intersecting at right angles to the other set of conducting wire elements disposed in parallel along the Y-direction. The three bases are laminated to form the coordinate determining tablet. As a cursor having a coil applied with an AC reference signal moves on the coordinate determining tablet, a phase modulated signal corresponding in amount to a displacement of the cursor is induced, at a cycle of interest, to parallel portions of conductive wires of the X-axis base for example. The displacement of the cursor can be determined over one cycle (360 degrees in electrical angle) by comparing the phase modulated signal with the phase of the AC reference signal applied to the cursor. In this case, assuming that only the two conducting wires displaced by a quarter pitch from each other are used, it cannot be identified if the cursor position corresponds to a position of an electrical angle $\theta$ or that of an electrical angle of $n \times 360° + \theta$ (where n is a positive integer). However, since the above prior art utilizes the selector base having conductive wire elements disposed in parallel, a output voltage having its magnitude corresponding to a different electrical angle is generated in accordance with the cursor position between two adjacent conductive wire elements. By detecting this output voltage, it becomes possible to determine the cursor position at a correct cycle, The cursor position relative to the Y-axis can be determined in a similar manner. The above-described prior art is excellent except a use of the selector base which results in a complicated structure of the tablet. In addition, since the structure of laminated three bases is used, the accuracy of determining the cursor position detends greatly not only upon the precision of arrangement of conductive wires on each base but also upon the precisions of alignment and lamination of the bases. Moreover, because of the above reason, the number of manufacturing processes of the apparatus and hence the cost may increase.

The disadvantages of the above Japanese Patent Laid-open Publication JP-A-49-67521 have been solved by Japanese Utility Model Laid-open Publication No. 55-55709 (Japanese Utility Model Publication No. 59-14858) as in the following manner. Namely, the coordinate determining tablet is constructed of X-axis cursor position determining conductive wires and Y-axis cursor position determining conductive wires, respectively formed on one and the other surfaces of a single electrically insulating sheet and intersected at right angles. The X- and Y-axis cursor position determining wires each are electrically insulated and arranged to have a comb configuration displaced by 180 degrees in electrical angle. The coordinate determining tablet according to the Japanese Utility Model Laid-open Publication No. 55-55709 is manufactured using a single sheet at minimum (or two sheets if one surface per sheet is used). Therefore, this tablet has various advantages in practical use, over the tablet disclosed in the first-mentioned Japanese Patent Laid-open Publication JP-A-49-67521 which requires a selector base. Namely, the manufacturing process is simple, the cost is low, there is no fear of a low alignment precision, and so on. The following disadvantages have been found, however, in the Japanese Utility Model Laid-open Publication No. 55-55709:

(a) Conductive wires selectively used for detecting a phase difference cover only half the pitch and in addition, the tablet is constructed of simply a two-phase system (sin, cos). Therefore, not only the range of change in phase difference is 180 degrees, but also a change in position of a position determining cursor becomes disproportional to a corresponding phase change near the conductive wires, resulting in a large distortion.

(b) Since detected voltages by the conductive wires are compared with each other to identify a specific location where the position determining cursor is present, the position detection becomes difficult in the case where the position determining cursor departs even slightly from the conductive wires, i.e., fluctuates up or down relative to the conductive wires.

Instead of tablets adopting a two-phase grid system as in the above-described prior art, there are known other tablets adopting a three-phase grid system as described in U.S. Pat. Nos. 4,552,991 and 4,570,033. The reason of adopting the three-phase grid system in these U.S. Pat.'s is to eliminate so-called edge effect. Particularly, in the case of the Japanese Patent Laid-open Publication JP-A-49-67512, conductive wires on the X-axis base juxtaposed in parallel with the Y-axis are sequentially coupled together by end turns in parallel with the X-axis to form a single continuous zig-zag pattern as a whole. However, a voltage induced to the end turn by the exciting cursor coil affects an output signal voltage appearing across the output terminals of the conductive wire of the X-axis base, irrespective of the fact that the induced voltage is not related to the displacement of the cursor along the X-axis. Thus an error occurs. As a means for eliminating such an error caused by the edge effect, it can be considered not to use the tablet area which is likely to produce an edge effect, which essentially makes the effective area of the tablet smaller and causes inconvenience in practical use. Further, an alternative method of eliminating such an error by using a suitable electronic circuit or by software may cause a complicated structure and operation of the tablet. In view of this, according to the above-mentioned U.S. Pat.'s, each set of the conductive grid windings of the X-and Y-axis bases are constructed of a three or more odd phase structure to thus compensate for error voltages induced to the end turns. Consequently, the position determining accuracy of the above-mentioned U.S. Pat.'s is improved as compared with that of a two-phase system. However, the following disadvantages are still present:

First, the structure and operation of the coordinate determining tablet not only of the type which adopts the system disclosed in U.S. Pat. Nos. 4,552,991 and 4,570,033 but also of the other type can be generally shown as in FIGS. 1 and 2, respectively. Since the conductive wire becomes asymmetrical relative to the cursor coil at both end portions thereof as seen from FIG. 2, there arises a disadvantage that a position determining error is likely to occur at both the end portions.

Second, the tablet disclosed in U.S. Pat. Nos. 4,552,991 and 4,570,033 requires in practice a first conductive wire group composed of three wires each having a pitch L as shown in FIG. 2 and a second conductive wire group (not shown in FIG. 2) composed of three wires each having a pitch $L+\Delta l$. Therefore, the tablet for both the directions of X-axis and Y-axis requires four conductive wire groups (systems), thus resulting in cumbersome and difficult pattern formation.

Furthermore, according to the above-mentioned U.S. Pat.'s, the cursor position along the X-axis is detected in a manner as shown in FIG. 3 wherein only the conductive wire group in the X-axis direction is shown. Specifically, as shown in FIG. 3(1), it is possible to obtain a phase angle $\theta_1$ from the conductive wire group having a pitch L and a phase angle $\theta_2$ from the conductive wire group having a pitch $L+\Delta l$, by detecting a phase difference from a reference phase of the excited cursor. The curve shown in FIG. 3(2) represents a phase difference $\theta_1-\theta_2$ between the two phase angles $\theta_1$ and $\theta_2$. By adding 360 degrees to the negative portions (indicated by triangles) of the curve shown in FIG. 3(2), a linear phase angle line $\theta_0$ can be obtained as shown in FIG. 3(3).

If the center of the cursor is positioned at point A shown in FIG. 3(3), it can be identified that the center is located at the fourth cycle of the conductive wire group having a pitch L (coarse position determination or cycle number determination). By detecting the magnitude of the phase angle $\theta_1$ at the fourth cycle of the conductive wire group having a pitch L, it is possible to correctly determine the position (fine position determination).

In manufacturing a large scale coordinate determining tablet of the above-mentioned U.S.P.'s, it is necessary to make the pitch difference $\Delta l$ of the two conductive wire groups small. This is due to the fact that a large $\Delta l$ restricts a span of the X-axis as the phase angle $\theta_0$ shown in FIG. 3(3) soon becomes 360 degrees.

On the contrary, if the $\Delta l$ is set too small, the incline of $\theta_0$ shown in FIG. 3(3) becomes so small as to be unable to ensure a sufficient accuracy of coarse position determination. To retain a good accuracy, it is necessary to make the pitch of the first conductive wire group large, which results in a lower resolution.

SUMMARY OF THE INVENTION

The present invention seeks to solve the disadvantages or problems associated with the above-described prior art. It is an object of the present invention to provide a novel coordinate position determining device with a high sensitivity for upward or downward movement of a cursor, a low distortion resulting from a characteristic of a change in phase difference amount relative to the cursor position, an easy manufacture of a large scale coordinate determining tablet without lowering a resolution, and a correct determination of the cursor position.

To achieve the above objects of the present invention, the present invention has adopted technical means briefly described in the following to which the structural features of the present invention is attributable. Namely, the present invention provides a coordinate position determining tablet for an X-Y coordinate position determining device which comprises mainly the following structures (i) to (iv):

(i) A plurality of conductive wires mounted on an insulating plate each are formed of a returned parallel winding pattern, and the conductive wires are displaced from each other by 1/n pitch (where n is 3, 5, 7, ...).

(ii) One end terminals of the plurality of conductive wires each forming the returned parallel winding pattern is connected to a common conductive wire, while the other end terminals are each connected to one terminal of an analog switch provided for each returned parallel winding pattern.

(iii) The other terminals of the analog switches provided for the respective patterns are cyclically connected to 3n common conductive wires at intervals of every 3n conductive wire.

(iv) The analog switches are grouped in units of n analog switches so as to turn on and off the returned parallel winding patterns at a same time for each one cycle, i.e., for adjacent n patterns.

Secondly the present invention provides an X-Y coordinate position determining method using a pair of coordinate position determining tablets as described above respectively for X and Y directions. The method is mainly constructed of a coarse position determining mode including the following steps (v) to (viii) and a fine position determining mode including the following steps (ix) to (xii).

[Coarse or Preliminary Position Determining Mode]

(v) Scanning is performed by turning on at a same time three groups of the analog switches by sequentially shifting one group after another, so that all the patterns corresponding to three cycles are scanned during one scan.

(vi) Signals induced on the returned parallel winding patterns corresponding to three cycles are added together for each group.

(vii) Three addition signals obtained through addition for each group are subjected to phase discrimination using a cursor excitation signal (a reference signal) to detect the polarities. The combination of the detected polarities are referred to for the recognition that the cursor is present at a particular cycle.

(viii) The number of scans by which the above recognition has been found is counted, thereby recognizing the cycle number N wherein the cursor is present.

[Fine or Final Position Determining Mode]

(ix) A group of three consecutive cycles is selected in such a manner that the cycle recognized by the above mode that the cursor is present at that cycle does not position at the extremity of the three cycles.

(x) Signals induced on the conductive wires at the same phase for each cycle are added together.

(xi) The phase difference between the addition signal and the reference signal (the cursor excitation signal) are compared with each other to thus recognize at which position the cursor is located within the cycle where the cursor is present.

(xii) An absolute position of the cursor is detected based on the cycle number described with (viii) and the position within that cycle.

BRIEF DESCRIPTION OF THE DRAWINGS

FIGS. 4 to 9 are views illustrating the structure and operation of a first embodiment of the present invention:

FIG. 4 is a perspective view showing the outline of patterning of a conductive wire group and a switching element group on the coordinate determining tablet of the embodiment;

FIG. 5 is a wiring diagram showing a part of the conductive wire group and switching element group on an X-axis insulating plate;

FIG. 6 is a graph used for explaining the operation of the embodiment wherein the waveforms of switch control signals are shown with respect to time, and the scan order by the switch control signals are shown;

In FIGS. 7A to 7C, the lower figures (b) show the circuit arrangement for producing the phase discrimination output signals, and the upper figures (a) show the phase discrimination output signals thus produced. In FIG. 7D, the lower figure (b) shows the circuit arrangement for producing the phase difference detector output signal and the upper figure (a) shows the phase difference detector output signal thus produced.

FIG. 8/is a block diagram showing the main part of the circuits used in the apparatus of the embodiment; and FIG. 9 is a schematic circuit diagram showing an example of the circuits of FIG. 8.

DESCRIPTION OF THE PREFERRED EMBODIMENTS

The structure and operation of an embodiment according to the present invention will be described with reference to the accompanying drawings.

A most simple, three phase structure is employed in one embodiment of the device.

First, the structure and operation of a coordinate determining tablet which is the most important element of the invention, will be described with reference to FIGS. 4 to 6.

Figure 4:
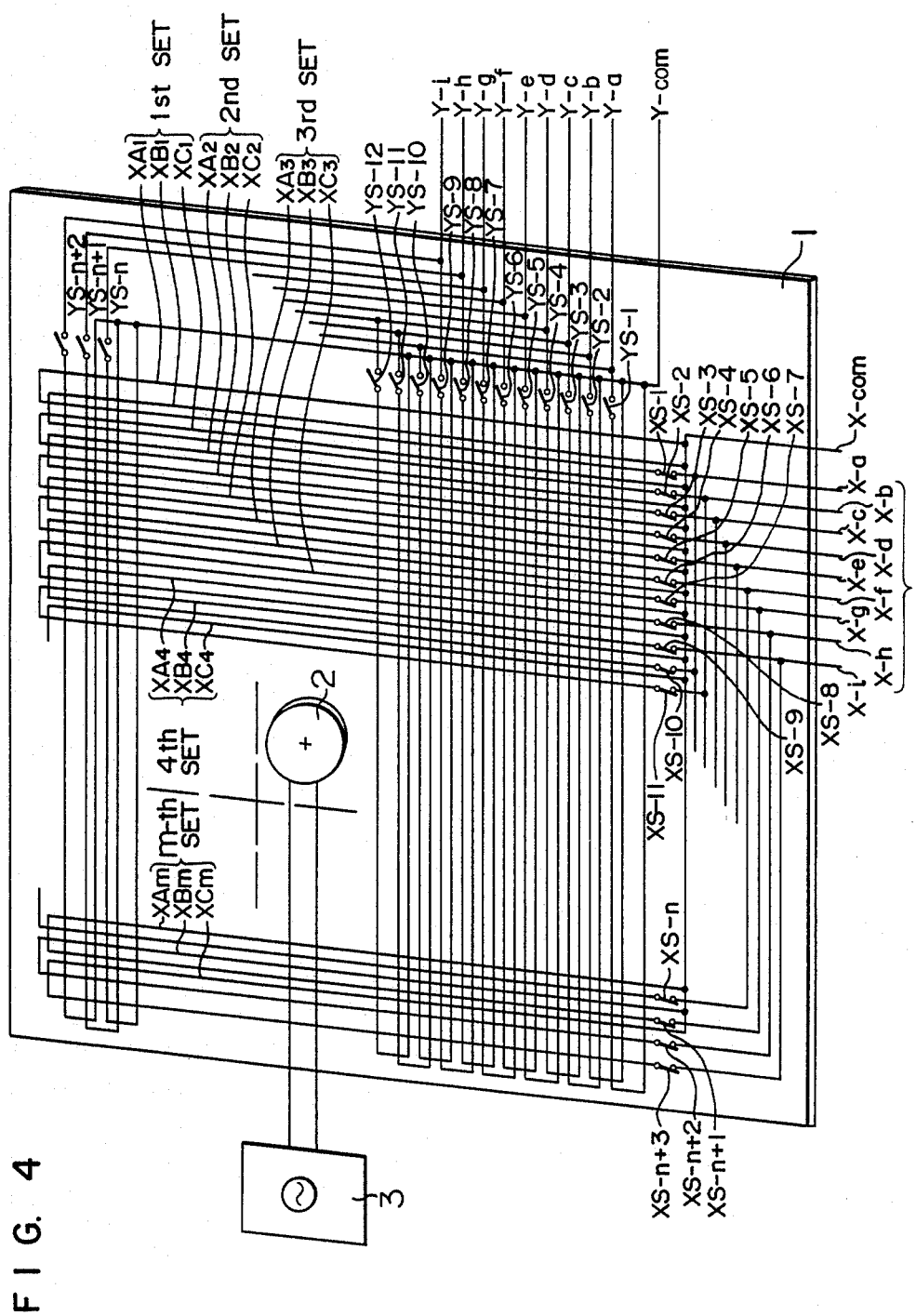

FIG. 4 is a perspective view showing the outline of a pattern of conductive wires and switching elements on a coordinate determining tablet according to an embodiment of the invention. In FIG. 4, the coordinate determining tablet 1 is made of an X-axis insulating plate 1' and a Y-axis insulating plate 1', laminated together. On one surface of the X-axis insulating plate 1', there is disposed a conductive wire group composed of a plurality of conductive wires $XA_1$, $XB_1$, $XC_1$, $XA_2$, $XB_2$, $XC_2$, $XA_3$, $XB_3$, $XC_3$, ..., $XA_{m-1}$, $XB_{m-1}$, $XC_{m-1}$, $XA_m$, $VB_m$, AND $XC_m$. Each conductive wire is formed in a rectangular shape with a folding section and two parallel longer sides, that is to say, is formed of a returned parallel winding pattern, and is regularly disposed over the whole surface of the insulating plate 1', with ⅓ pitch spacing between adjacent conductive wires. Similarly, on one surface of the Y-axis insulating plate 1", there is disposed a conductive wire group composed of a plurality of conductive wires each formed in a rectangular shape with a folding section and two parallel longer sides. The conductive wire group on the Y-axis insulating plate 1" is similar in structure to that on the X-axis except that the two conductive wires are disposed on the associated insulating plates at right angles relative to each other. Therefore, only the structure of the X-axis insulating plate 1' will be described as an example in the following.

The conductive wire group disposed on the X-axis insulating plate is composed of a plurality of sets, each set being composed of three adjacent conductive wires each of which is formed of a returned parallel winding pattern. Three conductive wires of each set are displaced by ⅓ pitch one after another. The third conductive wire of each set is also displaced by ⅓ pitch from the first conductive wire of the next set. In the Figure, the first set is composed of $XA_1$, $XB_1$ and $XC_1$, the second set is composed of $XA_2$, $XB_2$ and $XC_2$, the third set is composed of $XA_3$, $XB_3$ and $XC_3$, and up to the m-th set of $XA_m$, $XB_m$ and $XC_m$. The right longer side of each conductive wire is displaced by 1/6 pitch from the left longer sides of the adjacent conductive wires. Similarly, the left longer side of each conductive wire is displaced by 1/6 pitch from the right longer sides of the adjacent conductive wires. The conductive wires are electrically insulated from each other. Although the folding sections partially overlap each other in the practical X-axis plate structure, for the purposes of easy understanding, those sections are shown by displacing upward or downward in FIG. 4. One end or the right ends of the conductive wires are connected in common to a single common line or bus X-com, while the other ends or the left ends of the conductive wires are connected to known switching elements, e.g., analog switches XS-1, XS-2, XS-3, ..., XS-n, XS-n+1, XS-n+2, XS-n+3, respectively. Here, the single common line X-com may comprise an end turn section at the middle thereof as shown in FIG. 5 so as to cancel an induction voltage. The outputs from the analog switches are regularly connected in the following manner to one of 9 common output lines X-a, X-b, X-c, X-d, X-e, X-f, X-g, X-h and X-i. Specifically, the first set of conductive wires $XA_1$, $XB_1$ and $XC_1$ are connected via the associated analog switches XS-1, XS-2 and XS-3 to the common output lines X-a, X-b and X-c, respectively. The second set of conductive wires $XA_2$, $XB_2$ and $XC_2$ are connected via the associated analog switches XS-4, XS-5 and XS-6 to the common output lines X-d, X-e and X-f, respectively. The third set of conductive wires $XA_3$, $XB_3$ and $XC_3$ are connected via the associated analog switches XS-7, XS-8 and XS-9 to the common output lines X-g, X-h and X-i. The fourth set of conductive wires $XA_4$, $XB_4$ and $XC_4$ are connected via the associated analog switches XS-10, XS-11 and XS-12 to the above-mentioned common output lines X-a, X-b and X-c. The fifth set of conductive wires $XA_5$, $XB_5$ and $XC_5$ are connected via the associated analog switches XS-13, XS-14, XS-15 to the above-mentioned common output lines X-d, X-e and X-f, respectively. the sixth set of conductive wires $XA_6$, $XB_6$ and $XC_6$ are connected via the associated analog switches XS-16, XS-17 and XS-18 to the above-mentioned common output lines X-g, X-h and X-i, respectively. Such connection continues in a similar manner. And, the (m−2)-th set of conductive wires $XA_{m-2}$, $XB_{m-2}$ and $XC_{m-2}$ are connected via the associated analog switches XS-n-5, XS-n-4 and XS-n-3 to the above-mentioned common output lines X-a, X-b and X-c, respectively. The (m−1)-th set of conductive wires $XA_{m-1}$, $XB_{m-1}$ and $XC_{m-1}$ are connected via the associated analog switches XS-n-2, XS-n-1 and XS-n to the above-mentioned common output lines X-d, X-e and X-f, respectively. The m-th set of conductive wires $XA_m$, $XB_m$ and $XC_m$ are connected via the associated analog switches XS-n+1, XS-n+2 and XS-n+3 to the above-mentioned common output lines X-g, X-h and X-i, respectively. Here, some of the connections represented by the general notation are omitted in FIG. 4.

As described above, the nine common output lines X-a, X-b, X-c, X-d, X-e, X-f, X-g, X-h and X-i are connected to every ninth analog switches XS-1, XS-2, XS-3, XS-4, XS-5, XS-6, ..., XS-n+1, XA-n+2 and XS-n+3, respectively connected to the conductive wires $XA_1$, $XB_1$, $XC_1$, $XA_2$, $XB_1$, $XC_2$, ..., $XA_m$, $XB_m$ and $XC_m$. Specifically, the common output line X-a, for example, is connected to every ninth conductive wires $XA_1$, $XA_4$, $XA_7$, ..., via the analog switches XS-1, XS-10, XS-19, ... Such connection continues for the remaining common output lines. In FIG. 4 a coordinate pointer or cursor coil 2 freely movable on the surface of the coordinate tablet 1 is excited by an AC sine current generated by an AC signal generator 3 to thus generate an AC magnetic field and magnetic force lines linking conductive wires of the X-axis insulating plate 1' (and Y-axis insulating plate 1") near the cursor coil 2.

Figure 5:
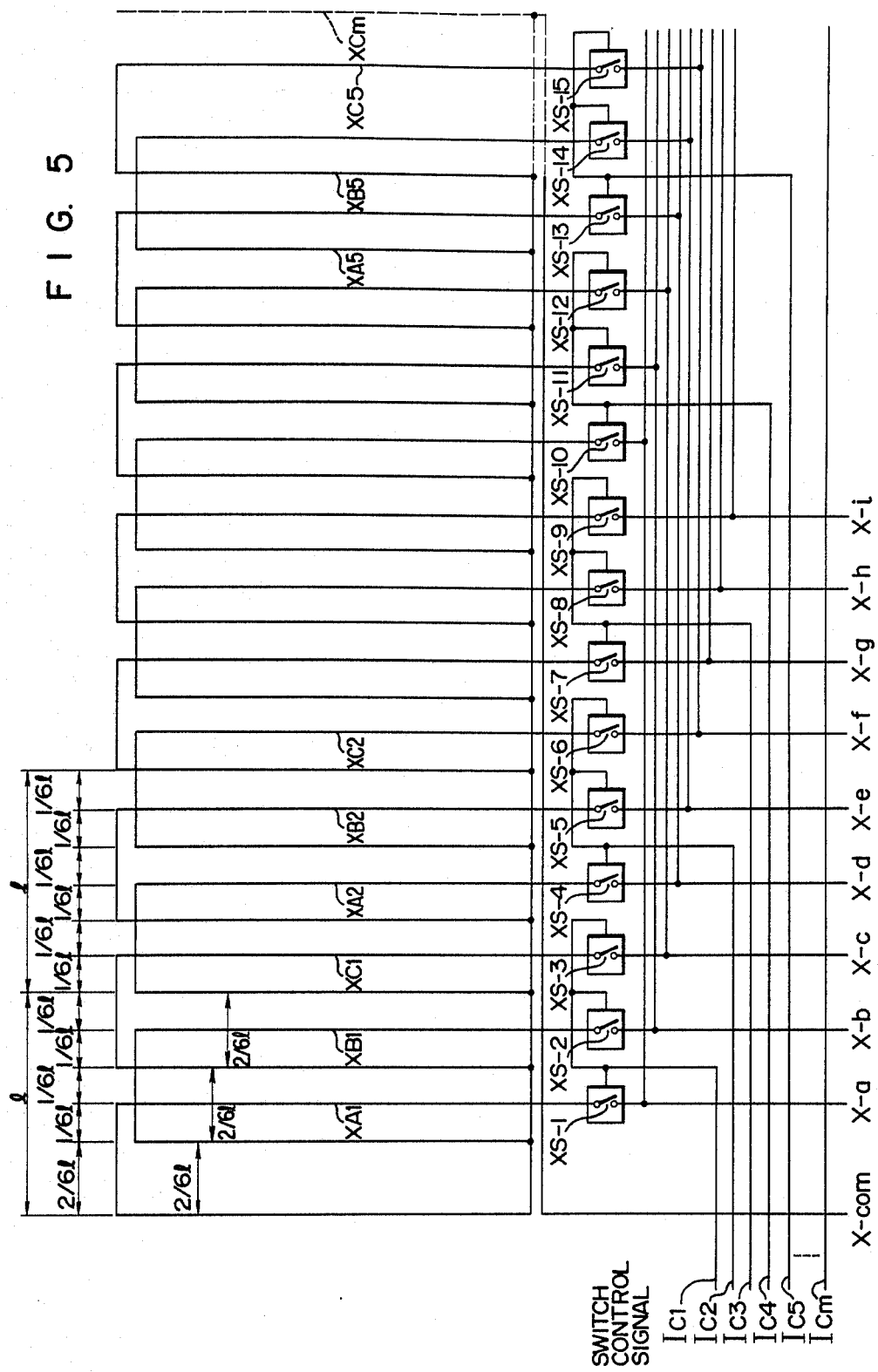
Figure 6:
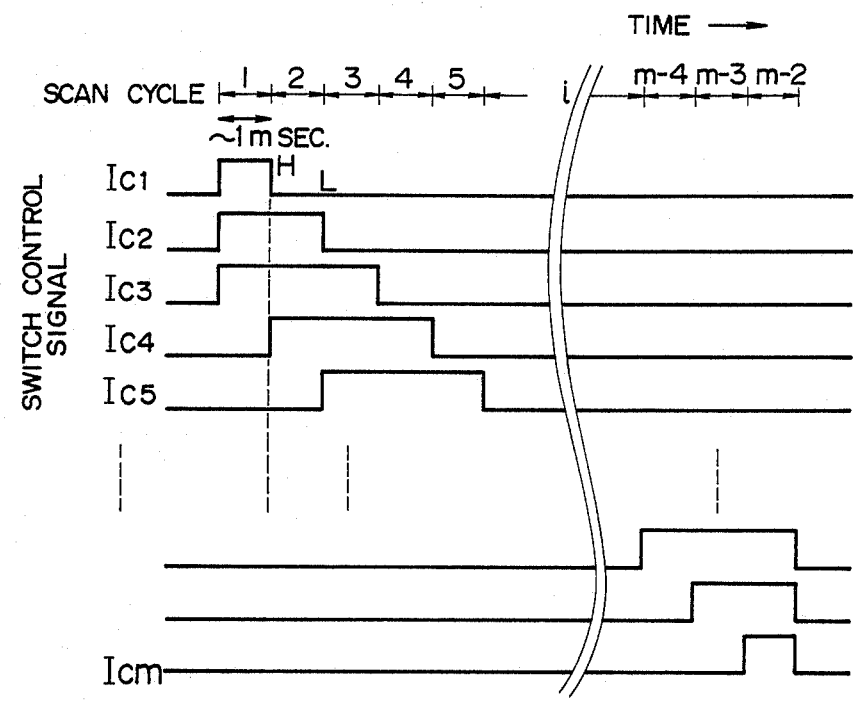

FIG. 5 partially shows the conductive wires of the X-axis insulating plate 1', and corresponds to FIG. 4 as seen from the back. Referring to FIG. 5, the conductive wires being formed of a returned parallel winding pattern are sequentially displaced by $\frac{1}{3}$ pitch (or phase) from each other. Specifically in FIG. 5, the spacing between conductive wires $XA_1$ and $XB_1$, $XB_1$ and $XC_1$, $XC_1$ and $XA_2$, $XA_2$ and $XB_2$, and $XB_2$ and $XC_2$ is set at $2/6 \, 1 = \frac{1}{3} \, 1$ where 1 is a unit pitch. Therefore, the spacing between adjacent left longer sides of conductive wires $XA_1$, $XB_1$, $XC_1$, $XA_2$, $XB_2$ and $XC_2$ becomes $2/6 \, 1 = \frac{1}{3} \, 1$. In the same way, the spacing between adjacent right longer sides of those conductive wires becomes $2/6 = \frac{1}{3}1$. The spacing between adjacent ones of left longer side of conductive wire $XB_1$, right longer side of conductive wire $XA_1$, left longer side of conductive wire $XC_1$, right longer side of conductive wire XB , left longer side of conductive wire $XA_2$, right longer side of conductive wire $XC_1$, left longer side of conductive wire $XB_2$, right longer side of conductive wire $XA_2$, left longer side of conductive wire $XC_2$, right longer side of conductive wire $XB_2$, and left longer side of conductive wire $XA_3$, becomes 1/6 1. Symbols $I_{c1}$, $I_{c2}$, $I_{c3}$, $I_{c4}$, $I_{c5}$, ..., $I_{cm}$ shown at the lower left of FIG. 5 represent switch control signals. In FIG. 5, the switch control signal $I_{c1}$ is connected to control terminals of the analog switches XS-1, XS-2 and XS-3 for the first to third conductive wires $XA_1$, $XB_1$, and $XC_1$. The switch control signal $I_{c2}$ is connected to control terminals of the analog switches XS-4, XS-5 and XS-6 for the fourth to sixth conductive wires $XA_2$, $XB_2$ and $XC_2$. The switch control signal $I_{c3}$ is connected to control terminals of the analog switches XS-7, XS-8 and XS-9 for the seventh to ninth conductive wires $XA_3$, $XB_3$ and $XC_3$ The switch control signal $I_{c4}$ is connected to control terminals of the analog switches XS-10, XS-11 and XS-12 for the tenth to twelfth conductive wires $XA_4$, $XB_4$ and $XC_4$. The switch control signal $I_{c5}$ is connected to control terminals of the analog switches XS-13, XS-14 and XS-15 for the thirteenth to fifteenth conductive wires $XA_5$, $XB_5$ and $XC_5$. Similar connection continues, and the switch control signal $I_{cm}$ is connected to control terminals of the analog switches XS-n+1, XS-n+2 and XS-n+3 (see FIG. 4) for the (n+1) to (n+3)-th conductive wires $XA_m$, $XB_m$ and $XC_m$. With such connection, it is possible to turn on and off the three consecutive analog switches upon application of high (H) and low (L) level switch control signals, respectively. Further, by applying switch control signals in the scan order as shown in FIG. 6, it is possible to sequentially scan every three conductive wires at a time while replacing one set of conductive wires with a new one set of conductive wires. By applying H level switch control signals $I_{cm-2}$, $I_{cm-1}$ and Icm, the last set (m-th set) of conductive wires can be scanned simultaneously with the (m-2) and (m-1)-th sets of conductive wires.

Figure 7A:
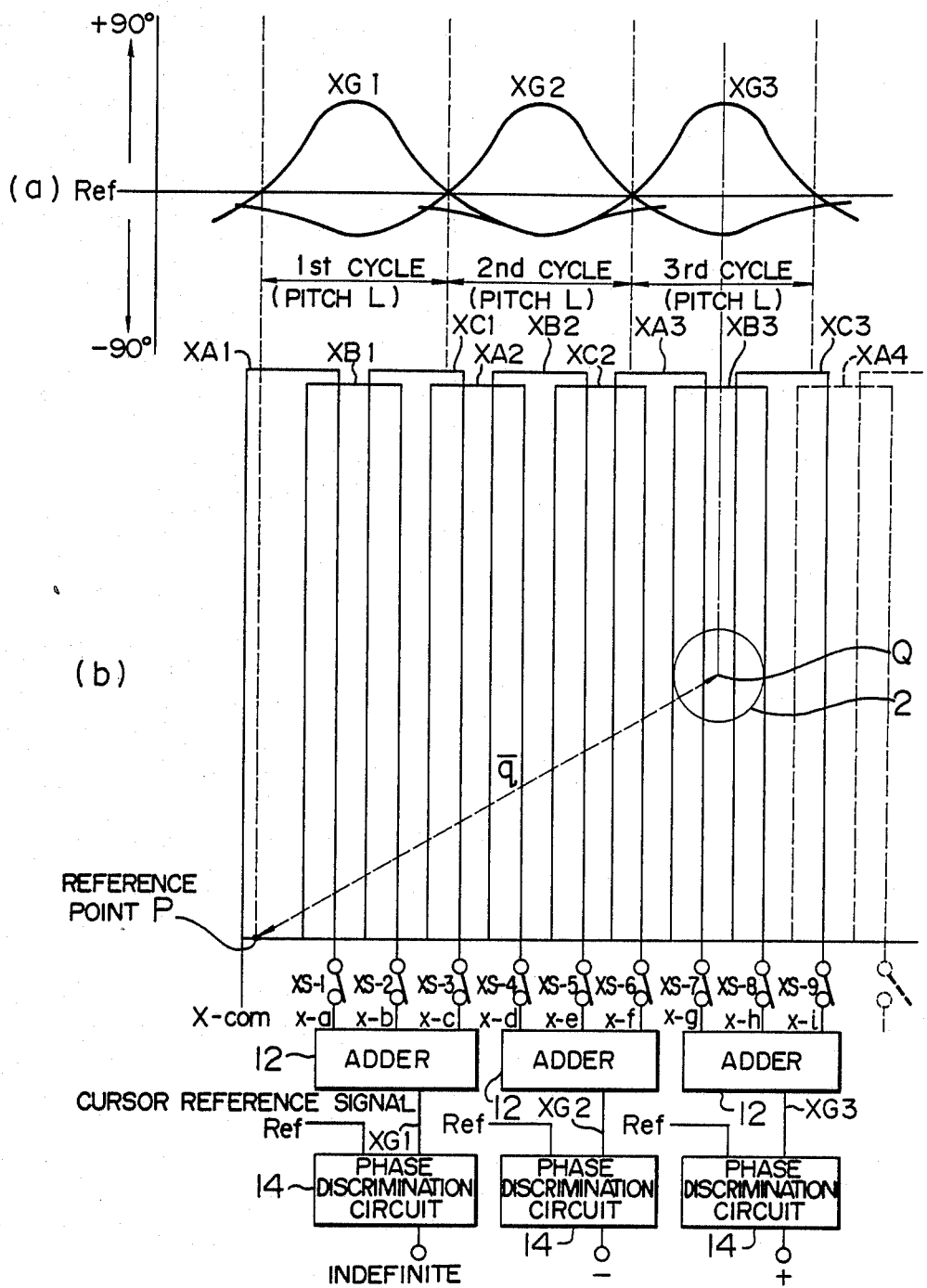
FIGS. 7A(a) and (b) to FIGS. 7C(a) and (b) illustrate the coarse coordinate position determining process of the embodiment.
Figure 7B:
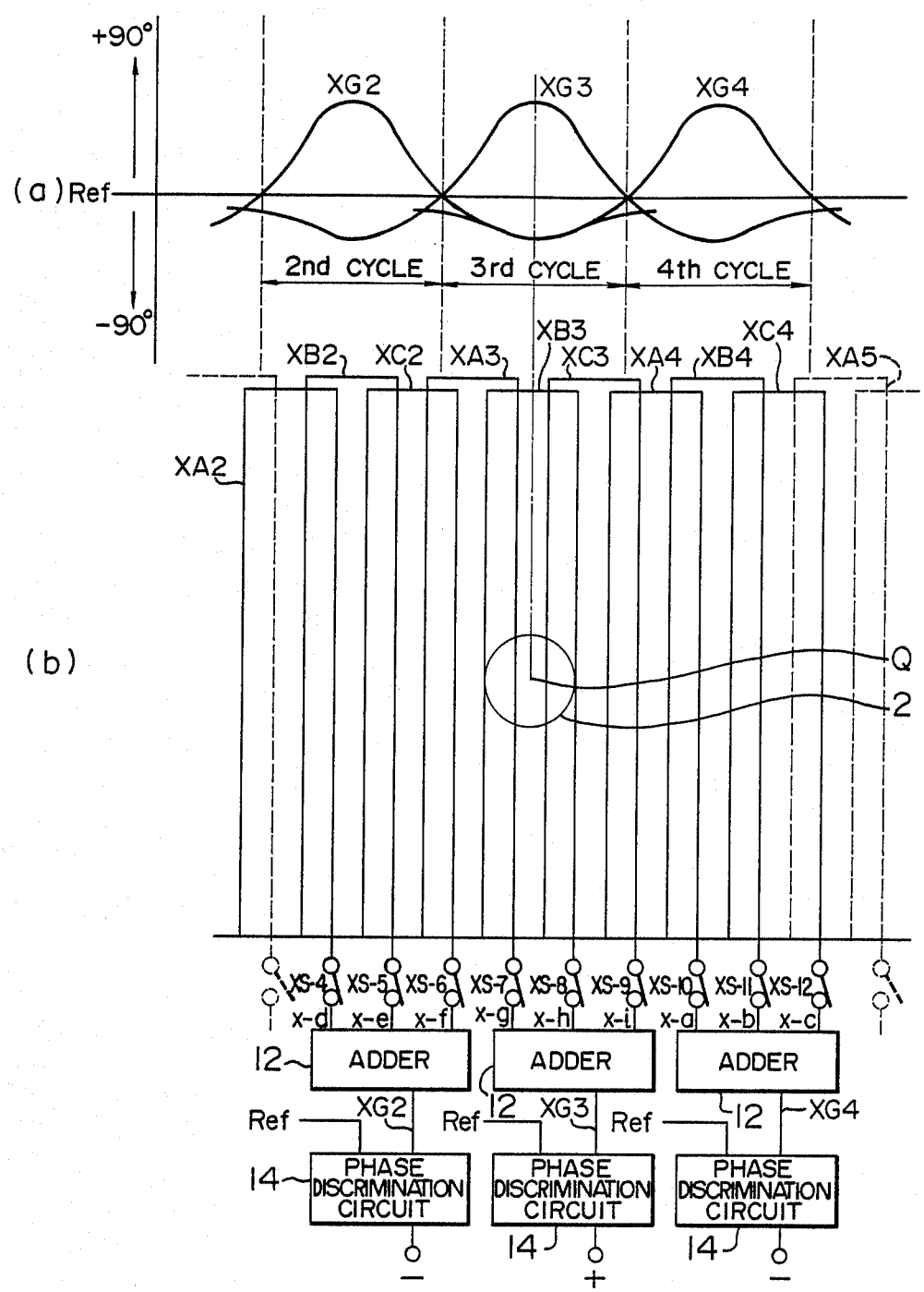
Figure 7C:
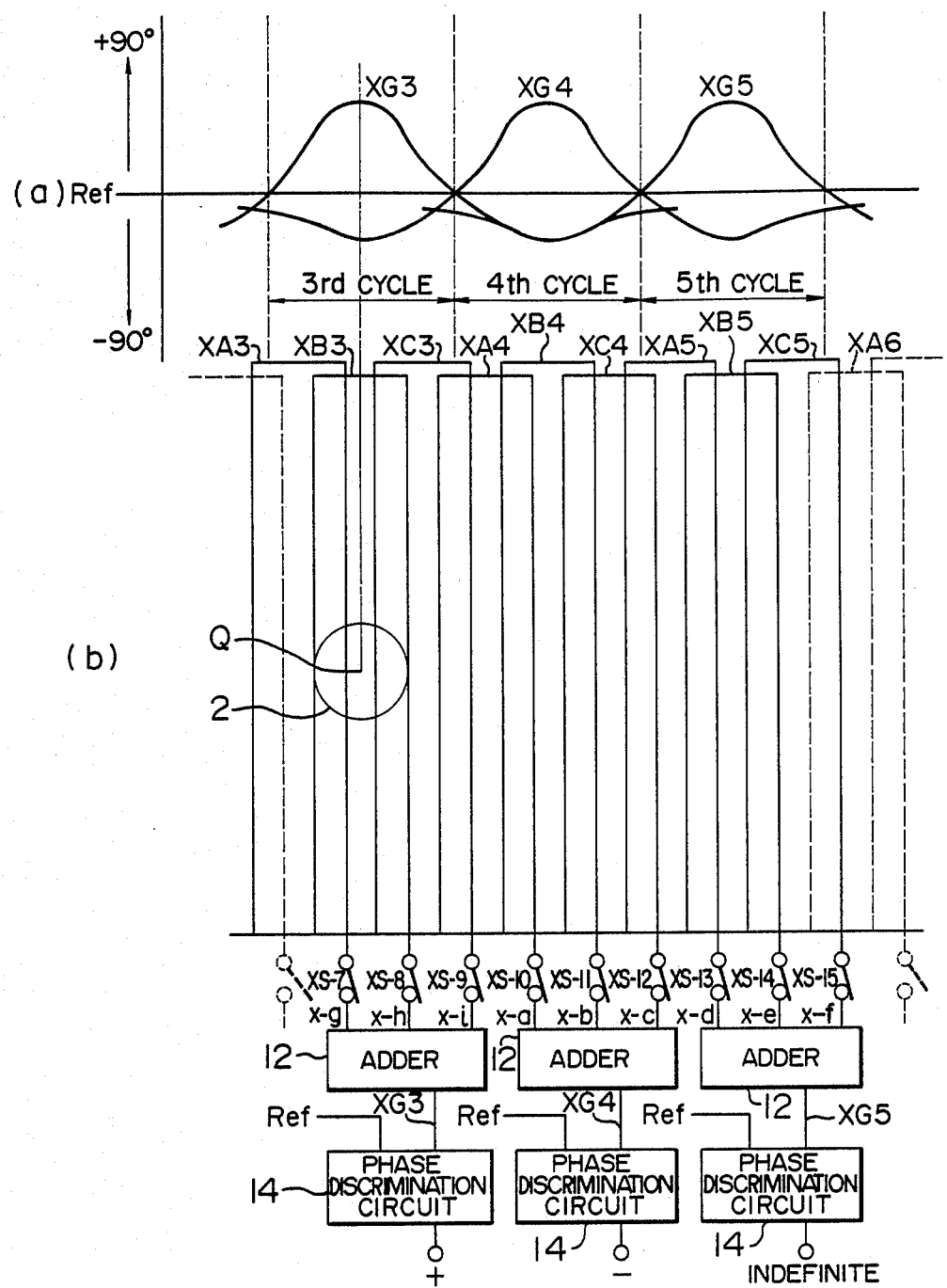
Figure 7D:
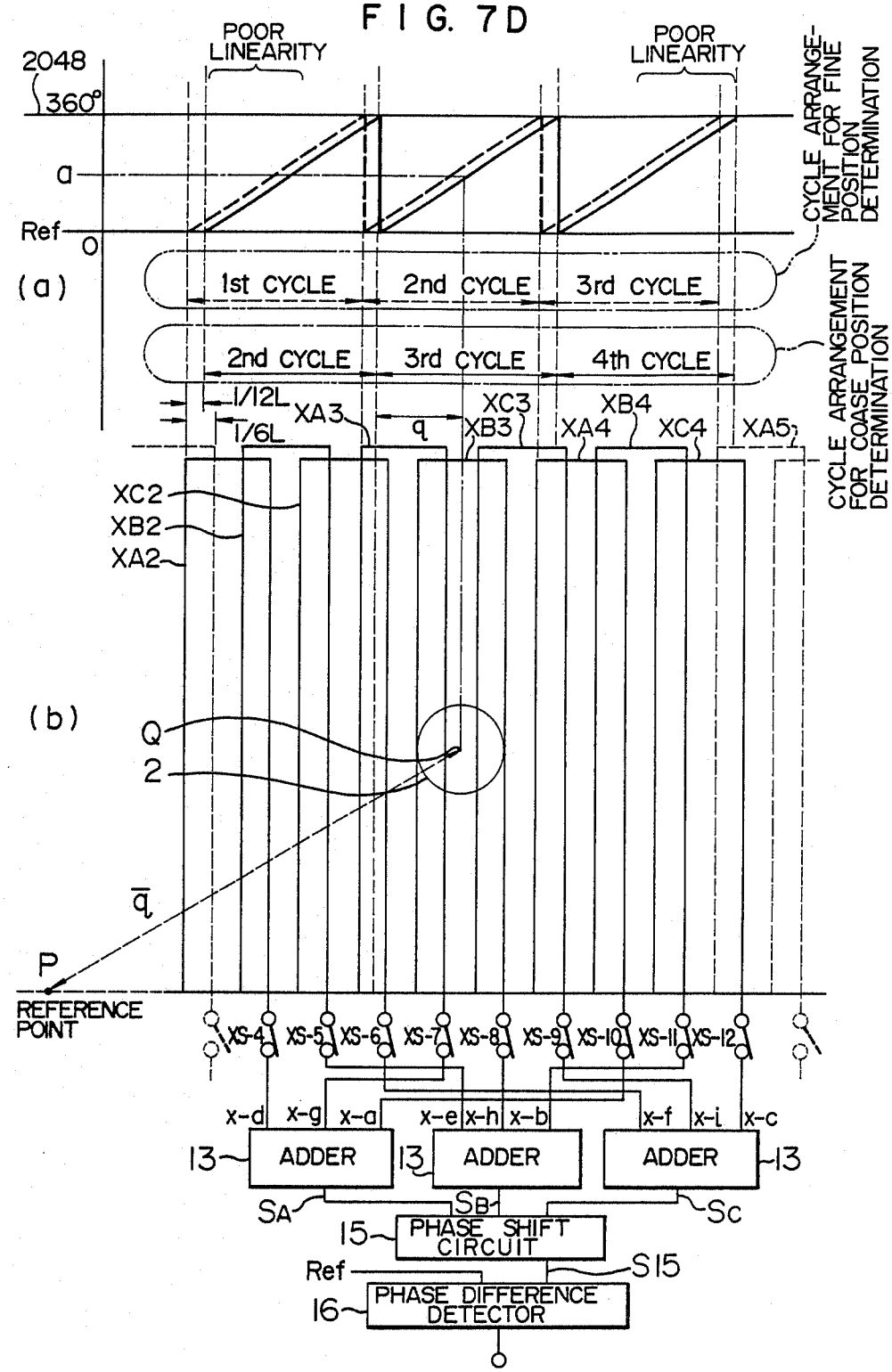
FIGS. 7D(a) and (b) illustrate an aspect of the fine position determining mode.

Next, the coordinate position determining process of an embodiment according to the invention will be described in detail, referring to FIGS. 7A to 7D. Here, the lower FIGS. (b) in FIGS. 7A to 7C show the relation between the cursor coil and the respective sets of three conductive wires which are connected to the respective groups of phase discrimination output signal producing circuits, and the upper figures (a) show the phase discrimination output signal waveforms generated by the respective groups of phase discrimination output signal producing circuits. Further, FIGS. 7D(a) and (b) illustrate an aspect of the fine position determining mode. In FIG. 7D, the lower figure (b) shows the circuit arrangement for producing the phase difference detector output signal and the upper figure (a) shows the phase difference detector output signal thus produced. The position determining process is mainly divided into a coarse position determining mode and a fine position determining mode which are performed, as in the following, in this order.

I. Coarse Position Determining Mode (i) Referring to the circuit shown in FIG. 7A(b), the cursor coil 2 excited by an output signal from the AC signal generator induces, through electromagnetic coupling, signals on three adjacent conductive wires ($XA_1$, $XB_1$, $XC_1$), ($XA_2$, $XB_2$, $XC_2$) and ($XA_3$, $XB_3$, $XC_3$) forming three groups, respectively. The signals having different amplitudes and phases are delivered to the associated output lines (X-a, X-b, X-c), (X-d, X-e, X-f) and (X-g, X-h, X-i) because, as shown in FIG. 6, the switch control signals $I_{c1}$, $I_{c2}$ and $I_{c3}$ are all high (H) during the scan cycle 1.

(ii) Adders 12 of the respective set each add together the signals from the associated three conductive wires to thereby obtain addition output signals $XG_1$, $XG_2$ and $XG_3$ which are then inputted to phase discrimination output signal producing circuits or phase discrimination circuits 14 at the next stage.

The addition output signals $XG_1$, $XG_2$ and $XG_3$ shown in FIG. 7A(a) are obtained by slowly moving the cursor from the start point of the first cycle to the end point of the third cycle and plotting outputs from the addition circuits 12.

(iii) Assuming that the cursor coil 2 is located at point Q of the third cycle shown in FIG. 7A(b), the addition signal outputs $XG_1$, $XG_2$ and $XG_3$ obtained for respective cycles corresponding to the center Q of the cursor coil 2 ($XG_1$, $XG_2$ and $XG_3$ have those values indicated at intersections between a one-dot-chain line and the signal output curves shown in FIG. 7A(a)). Phase discrimination signals are obtained by comparing the respective output signals $XG_1$, $XG_2$ and $XG_3$ with a reference signal (a cursor excitation signal which is a same signal shown in FIG. 7A(a) as Ref.). As seen from the waveforms shown in FIG. 7A(a), the phase discrimination signals are given by:

| $XG_1$ | $XG_2$ | $XG_3$ |
|---|---|---|
| Indefinite | − | + | wherein "+" indicates the phase is lead by 90 degrees relative to the reference signal, "−" indicates that the phase is lagged by 90 degrees relative to the reference signal, and "Indefinite" indicates that the phase is not measurable. The first scan is completed by the above steps (i) to (iii).

(iv) Next, since the switch control signals $I_{c2}$, $I_{c3}$ and $I_{c4}$ become high (H) level at the same time during the scan cycle 2 (see FIG. 6), shifted to the right as shown in FIG. 7B(b), signals are induced on three sets of conductive wires ($XA_2$, $XB_2$, $XC_2$), ($XA_3$, $XB_3$, $XC_3$) and ($XA_4$, $XB_4$, $XC_4$) shifted to the right direction by one pitch corresponding to one set of conductive wires and inputted via the output lines (X-d, X-e, X-f), (X-g, X-h, X-i) and (X-a, X-b, X-c) to the associated addition circuits 12.

(v) Similar to the case of the first scan, the addition output signals $XG_2$, $XG_3$ and $XG_4$ are obtained in this order from the left to the right of the addition circuits 12.

(vi) In this case, the cursor coil 2 is located at the middle of the three cycles (i.e. the third cycle in this embodiment) since the cycle shown in the circuit of FIG. 7B(b) corresponding to the waveforms of FIG. 7B(a) has shifted to the right. Therefore, the outputs from the phase discrimination circuits 12 with respect to the addition output signals at the intersections with the one-dot-chain line shown in FIG. 7B(a) are given by:

| $XG_2$ | $XG_3$ | $XG_4$ |
|---|---|---|
| − | + | − |

The second scan is completed by the above steps (iv) to (vi).

(vii) During the next scan cycle 3 (see FIG. 6), the switch control signals $I_{c3}$, $I_{c4}$ and $I_{c5}$ become high (H) level at the same time so that output signals are induced on three adjacent conductive wires shifted to the right direction by one pitch corresponding to one set of conductive wires. Thus, as shown in FIG. 7C(b) output signals from three sets of conductive wires ($XA_3$, $XB_3$, $XC_3$), ($XA_4$, $XB_4$, $XC_4$) and ($XA_5$, $XB_5$, $XC_5$) are processed in a similar manner to the above, resulting in the following phase discrimination outputs:

| $XG_3$ | $XG_4$ | $XG_5$ |
|---|---|---|
| + | − | Indefinite |

The above steps are for the third scan.

(viii) The fourth to n-th scans are sequentially performed in a similar manner to the above. The phase discrimination outputs for respective process stages are processed using a microcomputer so that the position Q of the cursor coil 2 can be recognized to be located within the third cycle defined by the conductive wires $XA_3$, $XB_3$ and $XC_3$.

According to this recognition scheme, three sets of the phase discrimination outputs are obtained, as in the following, taking the above-described case as an example:

| (i − 1)-th scan: | Indefinite | − | + |
|---|---|---|---|
| (i)-th scan: | − | + | − |
| (i + 1)-th scan: | + | − | Indefinite |

("i" is 2 in the above example shown in FIGS. 7A to 7C) It is to be noted that the cursor is present within the cycle having "+". In this connection, even at the (i-1) scan, the third pitch (in this example, the third cycle) has "+". Therefore, at this stage of the scan, it is possible to recognize that the cursor is present at that cycle. However, the embodiments described in this specification are constructed such that the cycle within which a cursor is present is recognized only when "+" is detected at least for all the three scans with the following exceptions, so as to avoid an erroneous "+" detection or disability of "+" detection due to external disturbance such as noises.

The exceptions are for the case where a cursor is present at the extremity portion, i.e., within the first, second, (m-1)-th and m-th cycles. In such a case, the recognition of the cycle where a cursor is present becomes slightly different from the foregoing description.

In case where a cursor is present within the first cycle, the discrimination outputs are given by:

| 1st scan: | + | − | Indefinite |
|---|---|---|---|
| 2nd scan: | − | Indefinite | Indefinite |
| 3rd scan: | Indefinite | Indefinite | Indefinite |

In this case, the phase discrimination output with "+" is only at the first pitch or first cycle of the first scan. However, it is not certain that the phase discrimination output with "+" has resulted from a real presence of the cursor or from the external disturbance such as noises. Therefore, it is not possible to definitely determine the presence of the cursor at the first cycle. Consequently, all the remaining cycles must be repeatedly scanned to check if the phase discrimination output with "+" occurs plural times. If so, it is possible to certainly recognize that the cursor is present at the first cycle.

In case where a cursor is present at the m-th or last cycle, the phase discrimination output is given by:

| (m − 2)-th scan: | Indefinite | − | + |
|---|---|---|---|

In this case, on condition that all the phase discrimination outputs before the (m-3)-th cycle are indefinite, it is possible to judge that the cursor is present at the m-th cycle.

The first or m-th (last) cycle wherein a cursor is present can be identified. However, an error of position determination may be likely to occur at the portions wherein a conductive wire is not present (i.e., at the start and end portions of conductive wires positioned nearer to the extremities of the tablet than the second and (m-1)th cycles), because the linearity of phase difference signal used for fine position determination is deteriorated at such portions. In this connection, such an error can be compensated, for example, by analyzing characteristics of phase difference signal and using software. However, in the present embodiments, the first and m-th (last) cycles are intended to be used as auxiliary cycles for the purpose of determining with high precision a coordinate position at the cycles between the first and last cycles. Therefore, in the present embodiments, the coordinate position determination is practically conducted within the range of the second to (m-1) cycles.

In case where a cursor is present at the second cycle, the phase discrimination outputs are given by:

| 1st scan: | − | + | − |
|---|---|---|---|
| 2nd scan: | + | − | Indefinite |

In this case, the third scan is not needed and the cycle where the cursor is present can be recognized by using only two scans.

In case where a cursor is present at the (m-1)-th cycle, the phase discrimination outputs are given by:

| (m − 4)-th scan: | Indefinite | Indefinite | Indefinite (this scan is not taken into consideration) |
|---|---|---|---|
| (m − 3)-th scan: | Indefinite | − | + |
| (m − 2)-th scan: | − | + | − |

Also in this case, the cycle where the cursor is present can be recognized by using only two scans (m-3) and (m-2).

Therefore, assuming that a reference point P is set at the start point of the first pitch as shown in FIG. 7A($b$), the position Q of cursor coil 2 (a distance from the reference point P) is defined approximately by:

$$2L \leq 3Q \leq 3L$$

(where L is a width or distance of each pitch)

The phase discrimination outputs at the cycles other than those shown in FIGS. 7A($b$), 7B($b$) and 7C($b$) are either "−" or "indefinite". Therefore, the description has been omitted.

In the description of this specification, it has been assumed that all the cycles are sequentially scanned. However, it is to be understood that the coarse position determination aims at recognizing a cycle where a cursor is present. Therefore, after a cycle has been recognized, the succeeding scans may be omitted. In this case, the position determination can be made more quickly.

In the present embodiments, the fine position determining mode described later are performed by the following conditions:

In the fine position determining mode, it is necessary to prepare three sets (corresponding to three cycles) of conductive wires, the cycle where a cursor is present being disposed at the middle of the three cycles. For instance, it is assumed that a cursor coil is present in the coarse position determining mode at the third cycle having a set of conductive wires ($XA_3$, $XB_3$, $XC_3$) shown in FIG. 7B. Then, the fine position determining mode is performed using the second cycle with ($XA_2$, $XB_2$, $XC_2$), third cycle with ($XA_3$, $XB_3$, $XC_3$) and fourth cycle with ($XA_4$, $XB_4$, $XC_4$).

The principal object of the coarse position determining mode of this embodiment is thus to find a cycle where the cursor coil 2 is present.

Therefore, it is to be noted that scan methods other than that described in the foregoing are also applicable.

For example, the analog switches connecting the conductive wires to nine output terminals may be constructed such that the analog switches each are independently controlled to be turned on and off. In this case, the scan may be conducted in units of one, two or more cycles. If the scan in units of one or two cycles are employed, the position determination is performed slower than the present embodiments.

II. Fine Position Determining Mode

After a cycle where the cursor coil 2 is present has been recognized in the above-described coarse position determining mode, the operation for finely determining the position of the cursor coil 2 starts.

As shown in FIG. 7D($a$) and ($b$), three cycles are selected wherein the cycle where the cursor coil 2 is present is disposed at the middle thereof. Signals induced on conductive wires ($XA_2$, $XA_3$, $XA_4$), ($XB_2$, $XB_3$, $XB_4$) and ($XC_2$, $XC_3$, $XC_4$), respectively of the same positional order in the three cycles, are obtained from associated output lines (X-d, X-g, X-a), (X-e, X-h, X-b) and (X-f, X-i, X-c), and added together by adders 13. The added outputs are inputted to a phase shift circuit 15 to obtain a phase shift signal.

Next, the phase shift signal is compared with the reference signal (having the same phase as that of current supplied to the cursor coil) at a phase difference detector 16 to thereby detect a phase difference.

The above operation will be described in more detail. Here, the interconnection itself shown in FIG. 7D($b$) appears to be equivalent to the three phase conductive wire arrangement using three cycles in the prior art shown in FIG. 2.

In obtaining a phase difference signal from the three cycle arrangement in the manner as discussed later, the start and end points of the cycle become displaced from those of the cycle used in the coarse position determining mode. In view of this, in the present embodiments, the phase difference signal obtained from the arrangement shown in FIG. 7D ($b$) is shifted by an amount corresponding to such displacement in order to make coincident both cycles for the coarse and fine position determining modes. In FIG. 7D($b$), the cursor is located on the conductive wires at the middle of the three cycles. The cursor is excited to induce an induction current to each conductive wire.

Signals induced on conductive wires $XA_2$, $XA_3$ and $XA_4$ are added by the adder 13 to obtain a signal $S_A$ which is determined by the following equation.

$$S_A = V_m \sin\left(2\pi \frac{X}{L} + \frac{2\pi}{3}\right)\sin\omega t \quad (1)$$

Similarly, signals $S_B$ and $S_C$ are determined by:

$$S_B = V_m \sin\left(2\pi \frac{X}{L}\right)\sin\omega t \quad (2)$$

$$S_C = V_m \sin\left(2\pi \frac{X}{L} + \frac{4}{3}\pi\right)\sin\omega t \quad (3)$$

where $V_m$ is a maximum amplitude of an induced voltage, and x is a distance from the start point of a pitch. The equation (2) is shifted by 0 degree, the equation (1) by 120 degree ($2\pi/3$) and the equation (3) by 240 degrees ($4\pi/3$), respectively using the phase shift circuit 15. The shifted signals are added to obtain a signal $S_{15}$ which is expressed by:

$$\begin{aligned}S_{15} &= V_m\sin\left(2\pi\frac{X}{L}\right)-\sin\omega t + V_m\sin\left(2\pi\frac{X}{L}+\frac{2\pi}{3}\right)\times \\ &\quad \sin\left(\omega t + \frac{2\pi}{3}\right) + V_m\sin\left(2\pi\frac{X}{L}+\frac{4}{3}\pi\right)\sin\left(\omega t + \frac{4}{3}\pi\right) \\ &= \frac{V_m}{2}\left\{\cos\left(\omega t + 2\pi\frac{X}{L}\right) - \cos\left(\omega t + 2\pi\frac{X}{L}\right) + \cos\left(\omega t - 2\pi\frac{X}{L}\right)\right. \\ &\quad \left. -\cos\left(\omega t + 2\pi\frac{X}{L}+\frac{4\pi}{3}\right) + \cos\left(\omega t - 2\pi\frac{X}{L}\right) - \cos\left(\omega t + 2\pi\frac{X}{L}+\frac{8}{3}\pi\right)\right\} \\ &= \frac{3}{2}V_m\cos\left(\omega t - 2\pi\frac{X}{L}\right)\end{aligned} \quad (4)$$

The addition signal $S_{15}$ defined by the equation (4) is compared with the cursor reference signal (cursor excitation signal) defined by the following equation (5) to thereby obtain a phase difference amount ($2\pi X/L$) proportional to the cursor position.

$$S_r = K\cos\omega t \quad (5)$$

Namely, the phase difference detector 16 compares the equations (4) and (5) to detect a phase difference signal $2\pi X/L$.

By multiplying a real value 2 X/L detected by the phase difference detector 16 by $L/2\pi$, it is possible to know the value X.

Triangular waveforms shown in FIG. 7D(a) are obtained by plotting the amplitude of a phase difference signal from the phase difference detector 16 while the cursor is moved from the left end portion to the right end portion of the conductive wire group shown in the FIG. 7D(b). The waveform shown by a broken line is a real output from the phase difference detector 16, while the waveform shown by a solid line is a signaf electrically displaced to make coincident the cycles.

As seen by the waveforms shown at the upper portion of FIG. 7D(a), a phase difference output at the middle cycle shows a good linearity.

The amplitude of a compensated output from the phase difference detector 16 is a when the cursor is located at the position shown in FIG. 7D(b). Therefore, the distance q from the pitch start point 0 to the cursor at the third cycle whose arrangement coincides with that in the coarse position determining mode, can be determined by:

$$2\pi q/L = a \therefore q = La/2\pi$$

(where a is represented by angle)

Since the embodiment employs a digital processing, the magnitude of phase difference within a cycle from 0 degree to 360 degrees is divided into 2048 steps as indicated in the FIG. 7D(a). The number of division is n powers of 2 which is readily processed by a microcomputer.

Thus, in this embodiment, the distance q to the cursor is obtained by:

$$q = aL/2048$$

where a is a value indicating a step within 2048 steps.

Based on the determinations in the coarse and fine position determining modes, a coordinate X of the position Q [a distance q from the reference point P (start point at the first pitch)] becomes:

$$X = 2L + (a/2048)L$$

Figure 8:
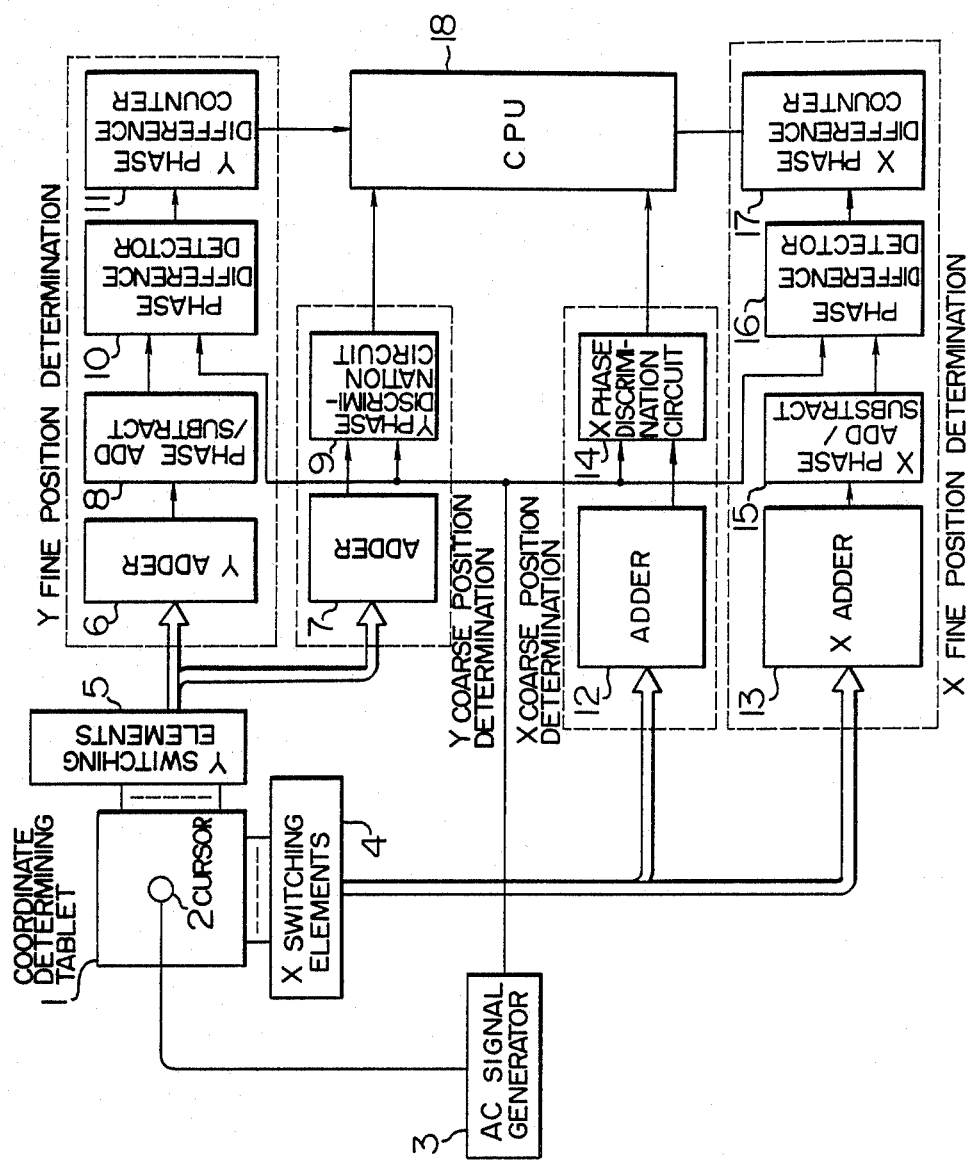

Shown in FIG. 8 is a circuit of this embodiment which determines the coordinates of an arbitrary point on the coordinate determining tablet, by using both the tablet 1 and cursor coil 2 shown in FIG. 4. The fundamental operation of this embodiment will be described with reference to FIG. 8. When the cursor coil 2 excited by an AC sine drive current outputted from the AC signal generator 3 is placed on the coordinate determining tablet 1, electromagnetic field having a same frequency as that of the drive current is generated at the vicinity of the cursor coil 2. As a result, electromotive forces induced by electromagnetic coupling are generated at a plurality of conductive wires disposed on the X- and Y-axis insulating plates 1' and 1" of the coordinate tablet 1. Obviously, an output from the AC signal generator 3 is also supplied to a clock generator (not shown) which generates clock signals for use in controlling the timings of the whole circuit. The switch control signals $I_{c1}$, $I_{c2}$, $I_{c3}$, ..., $I_{cm}$ (FIG. 5) described previously are also controlled by the clock signals. The X and Y switch groups 4 and 5 (constructed of analog switches as shown in FIG. 5) mounted on the X-axis and Y-axis insulating plates 1' and 1" of the coordinate determining tablet 1 operate to select one group of nine successive conductive wires and sequentially scan three sets of the conductive wires at a time. When the X and Y phase discrimination circuits 14 and 9 recognize that the cursor coil 2 is located at the middle of the three selected cycles both for the X-axis and Y-axis insulating plates, the scan is stopped at that time (X and Y coarse position determining mode). The coarse position determining data are inputted to a CPU 18 and held therein. Then, signals for every three conductive wires produced by the X adder 13 and X phase shift circuit 15, and the Y adder 6 and Y phase shift circuit 8, are compared with an output from the AC signal generator 3 by the phase difference detectors 16 and 10, respectively. The obtained phase difference signals are counted by X and Y phase difference counters 17 and 11, respectively (X and Y fine position determining mode). The obtained . fine position determining data are input to the CPU 18 and held therein. Then, the CPU 18 can determine the absolute position of the cursor coil 2 based on the number of scans performed for the conductive wires on the X and Y insulating plates and the data from the X and Y phase difference counters 17 and 11.

Figure 1:
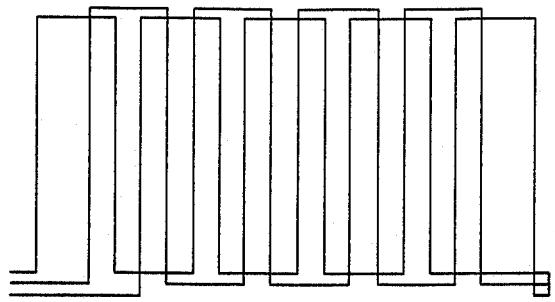
FIG. 1 shows the main part of a three grid structure according to the prior art.
Figure 2:
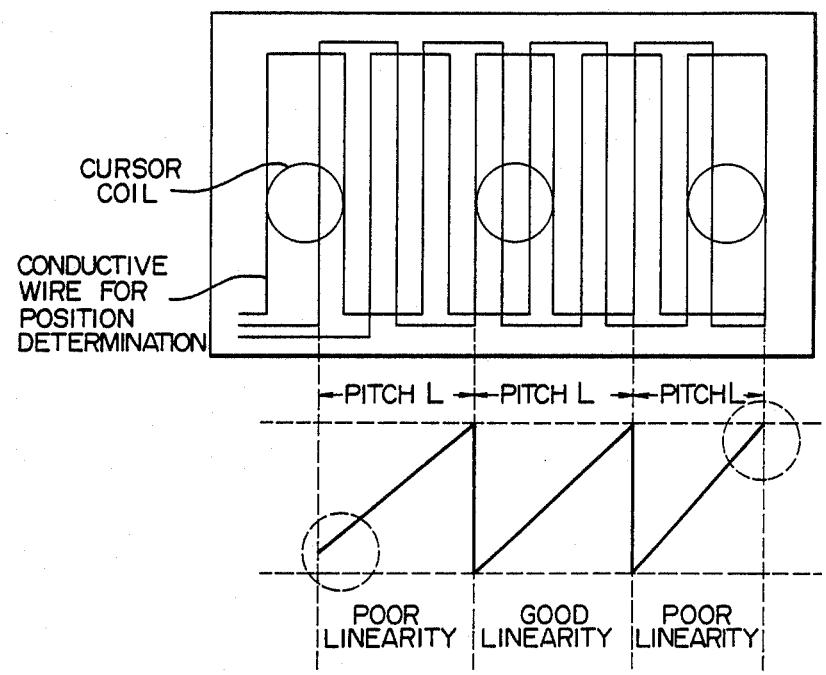
FIGS. 2 and 3 are views illustrating the operation of the three grid system.
Figure 3:
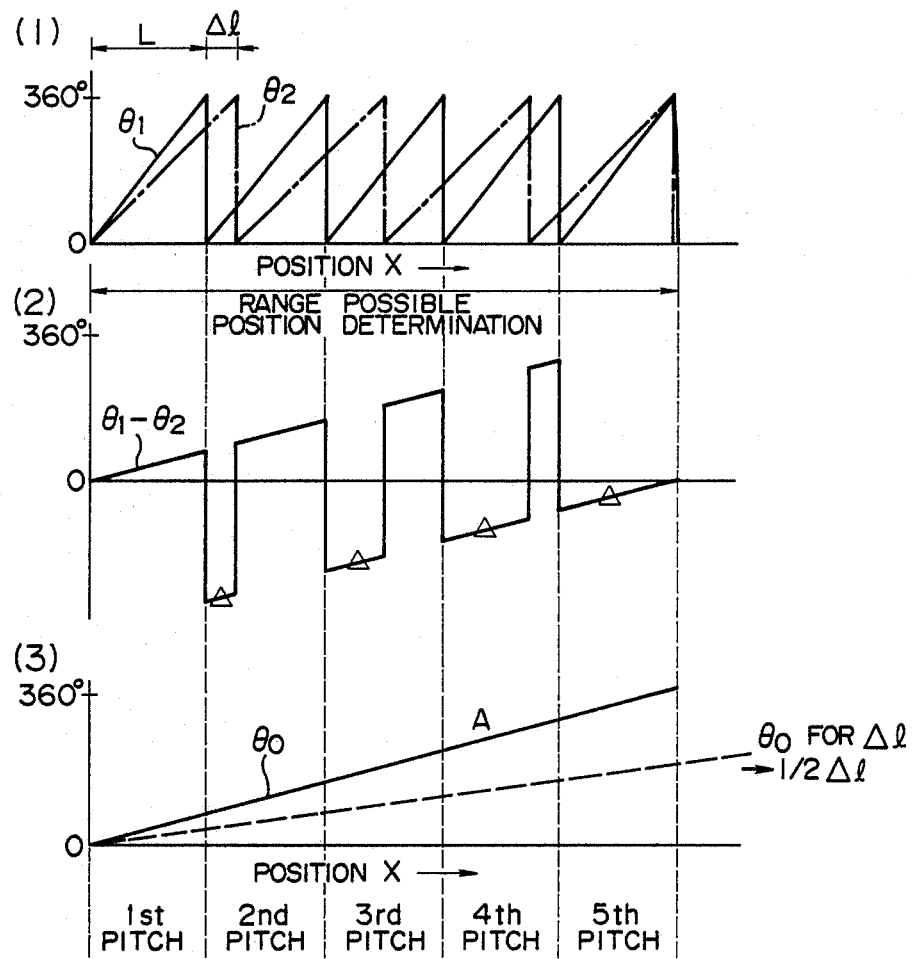

As shown in FIG. 7D(b), although it happens that selective connection of the analog switches and the nine common output lines connected to the analog switches may be considered as analogous to the induction signals detected from conductive wires in the three phase continuous coordinate determination as illustrated in FIG. 2 of the above-mentioned U.S. Pat. Nos. 4,552,981 and 4,570,033. However, the particular structure and operating principle of the present invention are quite different from the U.S. Pat.'s, as understood from the foregoing description of the present embodiments. Namely, although the present invention is partially the same as the U.S. Pat.'s from the viewpoint of three phase grid structure, according to the U.S. Pat.'s the difference is that the detected induction signals are subjected to proper phase shift and addition/subtraction, the resultant output is used to detect a phase difference from a drive current supplied to the cursor, and the phase difference is used to determine the position of the cursor. More in particular, as discussed previously, according to the embodiments of the present invention, the absolute position of the cursor coil 2 is identified only when a detected phase difference output from the phase difference detector 16 comparing an output from the phase shift circuit 15 with the drive current of the cursor coil (reference signal) is used together with the corresponding number of scans by the switch control signals.

Figure 9:
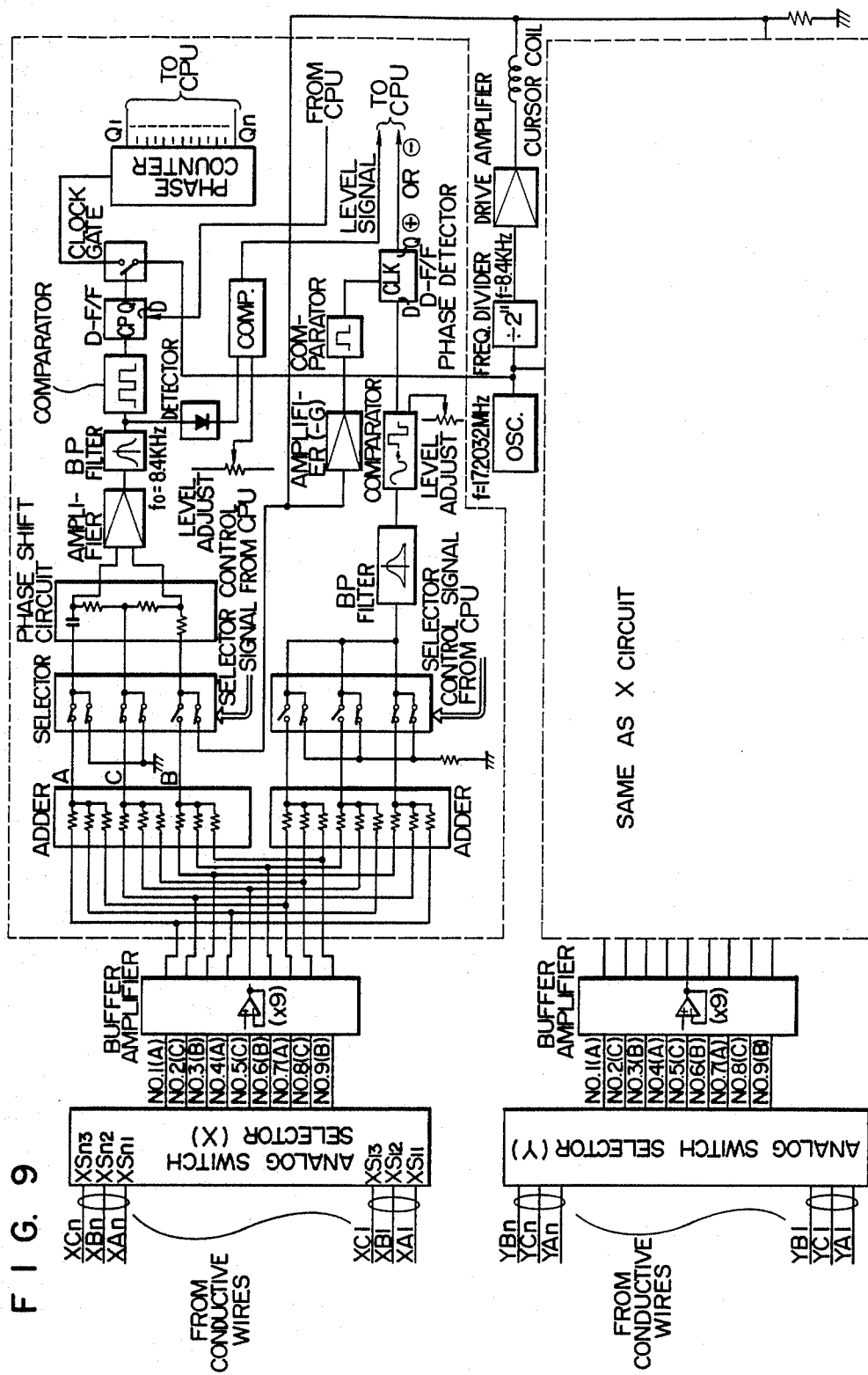

The circuit shown in the embodiment shown in FIG. 8 can be realized, for example, by the circuit shown in FIG. 9. In FIG. 9, those circuit portions corresponding to the main blocks in FIG. 8 are represented by using identical reference numbers, and the description for the detail structure and operation is omitted.

As seen from the foregoing description of the present invention, all the problems associated with the prior art are solved and the intended objects are effectively attained with the following distinctive effects by the provision of the structure which is the main feature of this invention different from the prior art.

By using the coordinate determining tablet used with an X-Y coordinate position determining device and the method of determining a coordinate position according to the present invention, a selector base is not necessary which has been required for the tablet of a conventional three layer base structure. Therefore, the structure is simplified and the cost is reduced. In addition, the sensitivity and accuracy are improved because there is little influence of the base alignment precision.

Further, to determine the absolute position of the cursor coil, the present invention adopts the coordinate determining tablet of a unique structure, in combination with the two unique modes of the coarse position determining mode using phase detection and polarity discrimination and the fine position determining mode using phase difference detection. Therefore, distortion does not become large which has been heretofore caused by the disproportion between the cursor position and the phase difference change amount near the conductive wires, as seen in a conventional two grid system using a tablet with comb-shaped conductive wires.

Furthermore, instead of employing voltage comparison between detected voltages to determine a position, the above-described two modes are used. Therefore, even though the cursor coil moves upward or downward relative to the conductive wires on the coordinate determining tablet, the accuracy and sensitivity are not lowered substantially, which allows applications of this invention to a large extent.

Furthermore, according to the method of this invention, in the fine position determining mode after the coarse position determining mode, signals induced to conductive wires at the same phase of the three cycles with the cycle where the cursor coil is present being arranged at the middle thereof, are added together and shifted and thereafter the resultant signal is compared with the excitation signal to obtain a phase difference signal. Therefore, the detected phase difference signal becomes linear within the middle cycle where the cursor is present, thus suppressing considerably the generation of distortion and position determination error and realizing a high position determination accuracy as compared with the prior art.

In addition, the tablet for two directions X and Y of this invention requires only 2 systems one for each direction. Therefore, as seen in the prior art three grid system which requires four systems for the tablet, there is no restriction that a pitch (cycle) difference between the two conductive wire groups mounted on each plate be made as small as possible. In addition, the structure is simplified and manufactured easily. The resolution is not deteriorated if the pitch difference is made large so as to obviate such restriction.

What is claimed is:

1. A coordinate determining tablet comprising: at least one rectangular insulating plate; a plurality of conductive wires mounted on one surface of said rectangular insulating plate, said conductive wires being insulated from each other and each conductive wire being made of an elongated conductive wire formed of a shape having a pair of parallel sections and an end turn section therebetween; and a plurality of analog switches mounted near one end portion of said rectangular insulating plate and provided in correspondence with said plurality of conductive wires, respectively; wherein said plurality of conductive wires are disposed such that between said pair of first and second parallel sections of one conductive wire, one of said parallel sections of an advancing conductive wire and another of said parallel sections of a succeeding conductive wire are juxtaposed at equal intervals, said end turn sections of said conductive wires are aligned substantially on a straight line, and said conductive wires are displaced from each other by 1/n pitch (where n is 3, 5, 7 ...) to form as a whole a returned parallel winding pattern;

ones of said parallel sections of said plurality of conductive wires are all connected to a common bus, the others of said parallel sections each are connected to one end terminal of an associated one of said plurality of analog switches; and the other end terminals of said plurality of analog switches are sequentially and cyclically connected to 3n common output lines; and said plurality of analog switches are grouped in units of n analog switches, and the analog switches belonging to each group are controlled to be turned on and off at a same time at the timing of one cycle of said returned parallel winding pattern, i.e., at the timing in units of n conductive wires.

2. A coordinate determining tablet according to claim 1, wherein said plurality of analog switches provided in correspondence with said plurality of conductive wires forming said returned parallel winding pattern on said rectangular insulating plate is constructed of a micro switch array disposed linearly at the vicinity of an end portion of said rectangular insulating plate perpendicular to said parallel sections of said plurality of conductive wires, and said linear micro switch array is integrally formed with said rectangular insulating plate.

3. A coordinate determining tablet according to claim 1, wherein said common bus connected to said ones of said parallel sections of said plurality of conductive wires extends near and along said one end portion perpendicular to said parallel sections of said plurality of conductive wires, and said common bus comprises an end turn section at the middle thereof and a pair of parallel sections extending over almost all the length of said one end portion and being spaced apart by a small distance.

4. A coordinate determining tablet according to claim 2, wherein said common bus connected to said ones of said parallel sections of said plurality of conductive wires extends near and along said one end portion perpendicular to said parallel sections of said plurality of conductive wires, and said common bus comprises an end turn section at the middle thereof and a pair of parallel sections extending over almost all the length of said one end portion and being spaced apart by a small distance.

5. A coordinate determining tablet according to claim 1, wherein said rectangular insulating plate is made of a solid, electrical insulating material selected from the group consisting of polypropylene, polystyrene, polyvinylede fluoride, polyamide, polyimide, phenol resin, epoxy resin, and unsaturated polyester resin.

6. A coordinate determining tablet according to claim 2, wherein said rectangular insulating plate is made of a solid, electrical insulating material selected from the group consisting of polypropylene, polystyrene, polyvinylede fluoride, polyamide, polyimide, phenol resin, epoxy resin, and unsaturated polyester resin.

7. A coordinate determining tablet according to claim 3, wherein said rectangular insulating plate is made of a solid, electrical insulating material selected from the group consisting of polypropylene, polystyrene, polyvinylede fluoride, polyamide, polyimide, phenol resin, epoxy resin, and unsaturated polyester resin.

8. A coordinate determining tablet according to claim 4, wherein said rectangular insulating plate is made of a solid, electrical insulating material selected from the group consisting of polypropylene, polystyrene, polyvinylede fluoride, polyamide, polyimide, phenol resin, epoxy resin, and unsaturated polyester resin.

9. A coordinate determining tablet according to claim 1, wherein said rectangular insulating plate is made of an electrically insulating ceramic.

10. A coordinate determining tablet according to claim 2, wherein said rectangular insulating plate is made of an electrically insulating ceramic.

11. A coordinate determining tablet according to claim 3, wherein said rectangular insulating plate is made of an electrically insulating ceramic.

12. A coordinate determining tablet according to claim 4, wherein said rectangular insulating plate is made of an electrically insulating ceramic.

13. A coordinate determining tablet according to claim 1, wherein at least one surface of said coordinate determining tablet mounted with said plurality of conductive wires forming said returned parallel winding pattern is further covered with an electrically insulating synthetic resin film substantially at the whole area of said surface.

14. A coordinate determining tablet according to claim 2, wherein at least one surface of said coordinate determining tablet mounted with said plurality of conductive wires forming said returned parallel winding pattern is further covered with an electrically insulating synthetic resin film substantially at the whole area of said surface.

15. A coordinate determining tablet according to claim 3, wherein at least one surface of said coordinate determining tablet mounted with said plurality of conductive wires forming said returned parallel winding pattern is further covered with an electrically insulating synthetic resin film substantially at the whole area of said surface.

16. A coordinate determining tablet according to claim 4, wherein at least one surface of said coordinate determining tablet mounted with said plurality of conductive wires forming said returned parallel winding pattern is further covered with an electrically insulating synthetic resin film substantially at the whole area of said surface.

17. A coordinate determining tablet according to claim 1, wherein of said plurality of conductive wires which are grouped by said plurality of analog switches in units of cycles, i.e., in units of n conductive wires, the first ad last groups of conductive wires are used as an auxiliary cycle.

18. A coordinate determining tablet according to claim 2, wherein of said plurality of conductive wires which are grouped by said plurality of analog switches in units of cycles, i.e., in units of n conductive wires, the first and last groups of conductive wires are used as an auxiliary cycle.

19. A coordinate determining tablet according to claim 3, wherein of said plurality of conductive wires which are grouped by said plurality of analog switches in units of cycles, i.e., in units of n conductive wires, the first and last groups of conductive wires are used as an auxiliary cycle.

20. A coordinate determining tablet according to claim 4, wherein of said plurality of conductive wires which are grouped by said plurality of analog switches in units of cycles, i.e., in units of n conductive wires, the first and last groups of conductive wires are used as an auxiliary cycle.

21. A coordinate determining tablet according to claim 5, wherein of said plurality of conductive wires which are grouped by said plurality of analog switches in units of cycles, i.e., in units of n conductive wires, the first and last groups of conductive wires are used as an auxiliary cycle.

22. A coordinate determining tablet according to claim 6, wherein of said plurality of conductive wires which are grouped by said plurality of analog switches in units of cycles, i.e., in units of n conductive wires, the first and last groups of conductive wires are used as an auxiliary cycle.

23. A coordinate determining tablet according to claim 7, wherein of said plurality of conductive wires which are grouped by said plurality of analog switches in units of cycles, i.e., in units of n conductive wires, the first and last groups of conductive wires are used as an auxiliary cycle.

24. A coordinate determining tablet according to claim 8, wherein of said plurality of conductive wires which are grouped by said plurality of analog switches in units of cycles, i.e., in units of n conductive wires, the first and last groups of conductive wires are used as an auxiliary cycle.

25. A coordinate determining tablet according to claim 9, wherein of said plurality of conductive wires which are grouped by said plurality of analog switches in units of cycles, i.e., in units of n conductive wires, the first and last groups of conductive wires are used as an auxiliary cycle 26. A coordinate determining tablet according to claim 10, wherein of said plurality of conductive wires which are grouped by said plurality of analog switches in units of cycles, i.e., in units of n conductive wires, the first and last groups of conductive wires are used as an auxiliary cycle.

27. A coordinate determining tablet according to claim 11, wherein of said plurality of conductive wires which are grouped by said plurality of analog switches in units of cycles, i.e., in units of n conductive wires, the first and last groups of conductive wires are used as an auxiliary cycle.

28. A coordinate determining tablet according to claim 12, wherein of said plurality of conductive wires which are grouped by said plurality of analog switches in units of cycles, i.e., in units of n conductive wires, the first and last groups of conductive wires are used as an auxiliary cycle.

29. A coordinate determining tablet according to claim 13, wherein of said plurality of conductive wires which are grouped by said plurality of analog switches in units of cycles, i.e., in units of n conductive wires, the first and last groups of conductive wires are used as an auxiliary cycle.

30. A coordinate determining tablet according to claim 14, wherein of said plurality of conductive wires which are grouped by said plurality of analog switches in units of cycles, i.e., in units of n conductive wires, the first and last groups of conductive wires are used as an auxiliary cycle.

31. A coordinate determining tablet according to claim 15, wherein of said plurality of conductive wires which are grouped by said plurality of analog switches in units of cycles, i.e., in units of n conductive wires, the first and last groups of conductive wires are used as an auxiliary cycle.

32. A coordinate determining tablet according to claim 16, wherein of said plurality of conductive wires which are grouped by said plurality of analog switches in units of cycles, i.e., in units of n conductive wires, the first and last groups of conductive wires are used as an auxiliary cycle.

33. An X-Y coordinate position determining method using a pair of coordinate determining plates, each of said coordinate determining plates comprising: at least one rectangular insulating plate; a plurality of conductive wires mounted on one surface of said rectangular insulating plate, said conductive wires being insulated from each other and each conductive wire being made of an elongated conductive wire formed of a shape having a pair of parallel sections and an end turn section therebetween; and a plurality of analog switches mounted near one end portion of said rectangular insulating plate and provided in correspondence with said plurality of conductive wires, respectively; and said pair of coordinate determining plates disposed such that a whole returned parallel winding pattern formed on one of said coordinate determining plates and that formed on the other of said coordinate determining plates become perpendicular to each other; said method comprising a coarse position determining mode and a fine position determining mode, said coarse position determining mode comprising the steps of:

(a) sequentially scanning the analog switches grouped in units of n analog switches by sequentially shifting one group and turning on and off three groups at a time so that the conductive wires formed in said returned parallel winding pattern, those 3n conductive wires corresponding to three analog switch groups, i.e., those conductive wires corresponding to three cycles of said returned parallel winding pattern, are scanned by sequentially shifting the conductive wires corresponding to one cycle;

(b) sequentially adding together, in units of groups, signals induced on said conductive wires forming said returned parallel winding pattern via said analog switches belonging to each group, and generating three added output signals;

(c) discriminating the polarities of said three added output signals based on a cursor coil excitation signal (a reference signal) through phase comparison, and recognizing a cycle where the cursor coil is present by referring to the combination of the discriminated polarities; and (d) counting the number of scans by which said cycle where said cursor coil is present has been recognized, and recognizing the order of said cycle, i.e., the cycle number N;

and said fine position determining mode comprising the steps of:

(e) selecting more than three cycles having at the middle thereof said cycle recognized by said coarse position determining mode that said cursor coil is present at said cycle such that said cycle does not position at the end portion of said more than three cycles;

(f) adding together signals induced on the conductive wires at the same phase of said selected three cycles, and generating an addition output signal;

(g) comparing the phases of said addition output signal with a cursor coil excitation signal to recognize at what position, within said cycle where said cursor coil is present, said cursor coil is located; and (h) based on said cycle number N recognized by the step (d) in said coarse position determining mode and the position within said cycle recognized by the step (g), determining an absolute position of said cursor coil on said coordinate determining plates.

34. An X-Y coordinate position determining method according to claim 33, the scan period at the step (a) wherein the conductive wires forming said returned parallel winding pattern corresponding to three cycles are scanned by sequentially shifting the conductive wires by one cycle, is controlled at shorter than 1 msec.

35. An X-Y coordinate position determining method according to claim 33, wherein said recognition at the step (c) wherein said cycle where said cursor coil is present is recognized by said three addition output signals, is performed in such a manner that said cycle where said cursor coil is present is recognized if "+" is detected for all the three scans at the intermediate scan cycle except the extremity cycle, i.e., a first, second, (m-1)-th and m-th cycles.

36. An X-Y coordinate position determining method according to claim 34, wherein said recognition at the step (c) wherein said cycle where said cursor coil is present is recognized by said three addition output signals, is performed in such a manner that said cycle where said cursor coil is present is recognized if "+" is detected for all the three scans at the intermediate scan cycle except the extremity cycle, i.e., a first, second, (m-1)-th and m-th cycles.

37. An X-Y coordinate position determining method according to claim 33, wherein said recognition at the step (c) wherein said cycle where said cursor coil is present is recognized by said three addition output signals, is performed in such a manner that said cycle where said cursor coil is present is recognized by two scans on condition that said cursor coil is present at the second cycle of a first scan or at the second cycle of a last scan.

38. An X-Y coordinate position determining method according to claim 34, wherein said recognition at the step (c) wherein said cycle where said cursor coil is present is recognized by said three addition output signals, is performed in such a manner that said cycle where said cursor coil is present is recognized by two scans on condition that said cursor coil is present at the second cycle of a first scan or at the second cycle of a last scan.

39. An X-Y coordinate position determining method according to claim 33, wherein said recognition at the step (c) wherein said cycle where said cursor coil is present is recognized by said three addition output signals, is performed by omitting the succeeding scans after said cycle where said cursor coil is present has been recognized.

40. An X-Y coordinate position determining method according to claim 34, wherein said recognition at the step (c) wherein said cycle where said cursor coil is present is recognized by said three addition output signals, is performed by omitting the succeeding scans after said cycle where said cursor coil is present has been recognized.

41. An X-Y coordinate position determining method according to claim 35, wherein said recognition at the step (c) wherein said cycle where said cursor coil is present is recognized by said three addition output signals, is performed by omitting the succeeding scans after said cycle where said cursor coil is present has been recognized.

42. An X-Y coordinate position determining method according to claim 36, wherein said recognition at the step (c) wherein said cycle where said cursor coil is present is recognized by said three addition output signals, is performed by omitting the succeeding scans after said cycle where said cursor coil is present has been recognized.

43. An X-Y coordinate position determining method according to claim 37, wherein said recognition at the step (c) wherein said cycle where said cursor coil is present is recognized by said three addition output signals, is performed by omitting the succeeding scans after said cycle where said cursor coil is present has been recognized.

44. An X-Y coordinate position determining method according to claim 38, wherein said recognition at the step (c) wherein said cycle where said cursor coil is present is recognized by said three addition output signals, is performed by omitting the succeeding scans after said cycle where said cursor coil is present has been recognized.

45. An X-Y coordinate position determining method according to any one of claims 33 to 44, wherein the step (h) wherein an absolute position of said cursor coil on said coordinate determining plates is detected, is performed in such a manner that said phase difference signal representative of the position of said cursor coil within said cycle where said cursor coil is present is shifted in accordance with the step (g) to make coincident the cycle arrangements of said coarse and fine position determining modes.

* * * * *